United States Patent [19]

Chiba et al.

[11] Patent Number: 5,607,992
[45] Date of Patent: Mar. 4, 1997

[54] SILICONE RUBBER COMPOSITION FOR INJECTION MOLDING

[75] Inventors: Shuji Chiba; Takeshi Matsumoto, both of Tokyo, Japan

[73] Assignee: Toshiba Silicone Co., Ltd., Tokyo, Japan

[21] Appl. No.: 605,807

[22] Filed: Feb. 23, 1996

Related U.S. Application Data

[63] Continuation of Ser. No. 297,037, Aug. 29, 1994, abandoned.

[30] Foreign Application Priority Data

Aug. 27, 1993 [JP] Japan .................... 5-212449

[51] Int. Cl.⁶ .................................. C08K 5/23
[52] U.S. Cl. ................... 524/190; 524/430; 524/588; 524/715; 525/478; 528/15; 528/31; 528/32
[58] Field of Search ........................ 524/190, 430, 524/588, 715; 525/478; 528/15, 31, 32

[56] References Cited

U.S. PATENT DOCUMENTS

| | | | |
|---|---|---|---|
| 3,862,081 | 1/1975 | Itoh et al. | 260/375 B |
| 4,310,444 | 1/1982 | Hamada et al. | 260/375 B |
| 4,477,641 | 10/1984 | Matsumoto | 525/478 |
| 4,692,475 | 9/1987 | Rowland et al. | 521/92 |
| 4,931,485 | 6/1990 | Inoue et al. | 525/478 |
| 5,010,137 | 4/1991 | Umeda et al. | 525/478 |
| 5,122,585 | 6/1992 | Sumpter et al. | 525/478 |
| 5,204,437 | 4/1993 | Ikeno et al. | 525/478 |
| 5,216,104 | 6/1993 | Okami et al. | 524/430 |
| 5,240,765 | 8/1993 | Takahashi et al. | 524/715 |
| 5,346,932 | 9/1994 | Takahashi et al. | 524/588 |

FOREIGN PATENT DOCUMENTS

| | | |
|---|---|---|
| 0037226 | 10/1981 | European Pat. Off. . |
| 0415180 | 3/1991 | European Pat. Off. . |
| 0490523 | 6/1992 | European Pat. Off. . |

*Primary Examiner*—Mark D. Sweet
*Attorney, Agent, or Firm*—Sughrue, Mion, Zinn, Macpeak & Seas

[57] ABSTRACT

An addition reaction type silicone rubber composition for injection molding compounded with an azo compound, carbon black, and at least one of cerium hydroxide and cerium oxide is disclosed. Silicone rubber moldings having a small compression set and an excellent flame retardance are obtained without need of carrying out a postcure after primary molding. Further, integral molding of the silicone rubber and a thermoplastic resin can be carried out.

12 Claims, No Drawings

5,607,992

1

SILICONE RUBBER COMPOSITION FOR INJECTION MOLDING

This is a Continuation of application Ser. No. 08/297,037 filed Aug. 29, 1994 now abandoned.

FIELD OF THE INVENTION

The present invention relates to a silicone rubber composition for injection molding, and more particularly to a silicone rubber composition for injection molding, which does not require a postcure after primary molding, has a small compression set, and has an excellent flame retardance.

BACKGROUND OF THE INVENTION

As a silicone rubber composition capable of curing by heating in a short time, there are a peroxide vulcanization type silicone rubber which forms a rubbery elastic body by crosslinking by compounding a silicone raw rubber comprising a straight chain highly polymerized polyorganosiloxane with an organic peroxide followed by heating and an addition reaction type (platinum vulcanization type) silicone rubber which forms a rubbery elastic body by carrying out crosslinking by the addition reaction between a vinyl group-containing polyorganosiloxane and a polyorganohydrogensiloxane in the presence of a platinum catalyst, and these silicone rubbers are widely used. In the former, it is required to complete the crosslinking by secondary heating called a postcure after carrying out the primary molding; and in the latter, in the case of moldings which are used in a place to which a compressive stress is applied for a long time, the postcure is necessary to particularly reduce the compression set.

Injection molding is frequently employed for the mass production of moldings. Thus, for generally rationalizing the production steps of moldings, a silicone rubber composition which can provide moldings having a small compression set without the need of a postcure step has been desired. This need has become recently particularly remarkable with the increase of the use of integral injection molded products (composite moldings) with various kinds of thermoplastic resins which cannot endure the postcuring temperature of an ordinary silicone rubber.

For filling such a need, investigations have been made on both the base polymer and various kinds of compounding agents. As the former, there is, for example, a method of bonding plural vinyl groups to each of both terminals of the molecular chain of the base polymer as disclosed in JP-A-63-270763 (the term "JP-A" as used herein means an "unexamined published Japanese patent application") and as the latter, there are, for example, a method of adding a triazole compound as disclosed in JP-A-2-242854 and a method of adding a vinyl group-containing organosilazane as disclosed in JP-A-63-268764. However, in the former method, the synthesis of the base polymer is complicated which increases the cost and in the latter methods, there are problems in the points of safety and hygiene and also sufficient results are not obtained.

On the other hand, it has been widely desired to impart a flame retardance to injection molded products. It is known that when a flame retardance imparting agent such as a platinum compound, carbon black, an azo compound, a triazole compound, iron oxide, etc., is compounded with the above-described peroxide vulcanization type silicone rubber compositions, the flame retardance thereof is improved. It is

2 also known that the flame retardance of these silicone rubber compositions is more improved by increasing the compounded amount of the filler which is an incombustible component and reducing the compounded amount of a polyorganosiloxane which is a combustible component. As such a flame retarding technique, a method for rendering a silicone rubber flame retardant by using a carboxylic acid amide and cerium oxide together is disclosed in JP-B-60-1895 (the term "JP-B" as used herein means an "examined published Japanese patent application"). However, since such a technique is by a crosslinking mechanism of a peroxide vulcanization, it is necessary to carry out a postcure and also in the method, even when a postcure is carried out, a good effect is not obtained about the compression set. Furthermore, in the flame retardant silicone rubber compositions obtained by this method, the apparent viscosities of the uncured mixtures are all very high, and the silicone compositions cannot be used for use requiring flowability, such as a material for injection molding.

On the other hand, it has been attempted to improve the flame retardance of the addition reaction type silicone rubber composition using a flowable polyorganosiloxane as the base polymer by compounding therewith the flame retardance imparting agent as described above. However, in this method, for obtaining a satisfactory flame retardance and a satisfactory mechanical strength, it is required to extremely increase the compounding amount of a reinforcing filler and also if the flame retardance is improved, the compression set is deteriorated, whereby it is difficult to simultaneously satisfy both of these characteristics, which has been desired.

SUMMARY OF THE INVENTION

Accordingly, an object of the present invention is to provide a silicone rubber composition for injection molding capable of giving silicone rubber moldings having a small compression set and an excellent flame retardance by primary molding only by injection, that is, without the need of a postcure step.

As a result of investigation to overcome the above-described theme, it has been found that when an azo compound which is conventionally known as a flame retardance imparting agent for a peroxide vulcanization type silicone rubber is added to an addition reaction type silicone rubber, the silicone rubber not only becomes very excellent in the curing property but also gives silicone rubber moldings having a small compression set by primary molding only and also by using the azo compound together with a specific cerium compound and carbon black, a more excellent flame retardance can be imparted to the moldings without increasing the compression set. The present invention has been attained based on this finding.

That is, the present invention is directed to a silicone rubber composition for injection molding, which comprises (A) 100 parts by weight of a polyorganosiloxane having at least 2 monovalent aliphatic unsaturated hydrocarbon groups bonded to a silicon atom in one molecule, (B) a polyorganohydrogensiloxane having at least 3 hydrogen atoms bonded to a silicon atom in one molecule in such an amount that the number of the hydrogen atoms bonded to the silicon atom becomes from 0.5 to 5 per one monovalent aliphatic unsaturated hydrocarbon group in the component (A), (C) a platinum type catalyst in an amount of from 1 to 100 ppm by weight converted as the platinum atom based on the weight of the component (A), (D) from 20 to 200 parts by weight of a silica fine powder,
(E) from 0.01 to 1.0 part by weight of an azo compound,
(F) from 0.5 to 15 parts by weight of carbon black, and
(G) from 0.1 to 2.0 parts by weight of at least one kind of cerium hydroxide and cerium oxide.

DETAILED DESCRIPTION OF THE INVENTION

The present invention is described in detail below.

The polyorganosiloxane used as the component (A) in the present invention is a component as the base polymer in the silicone rubber composition for injection molding of the present invention. Any polyorganosiloxane can be used as the component (A) if it has at least 2 monovalent aliphatic unsaturated hydrocarbon groups bonded to the silicon atom in one molecule and can form a network structure by an addition reaction.

Examples of the monovalent aliphatic unsaturated hydrocarbon group are vinyl, allyl, 1-butenyl, 1-hexenyl, etc., but in the points that the synthesis is easy and the flowability of the composition before curing and the heat resistance of the composition after curing are not reduced, a vinyl group is most advantageous.

Examples of other organic groups bonded to the silicon atoms of the component (A) are alkyl groups such as methyl, ethyl, propyl, butyl, pentyl, hexyl, octyl, decyl, dodecyl, etc.; aryl groups such as phenyl, etc.; aralkyl groups such as benzyl, 2-phenylethyl, 2-phenylpropyl, etc.; and saturated hydrocarbon groups such as chloromethyl, chlorophenyl, 2-cyanoethyl, 3,3,3-trifluoropropyl, etc. In these groups, from the points that the synthesis is easy and the balance of characteristics such as mechanical strength and the flowability before curing, etc., is excellent, a methyl group is most preferred.

The monovalent aliphatic unsaturated hydrocarbon groups may exist at the terminals or intermediate portions of the molecular chain of the polyorganosiloxane (A) or may exist at both of these portions of the molecular chain, but for imparting an excellent mechanical property to the composition after curing, in the case of a straight chain, it is preferred that the groups exist at least at both terminals.

The siloxane skeleton may be a straight chain form or a branched form. For improving the mechanical characteristics of the composition after curing and for use in molding of a complicated form such as prototype, etc., it is preferred to use a mixture of a straight chain polydiorganosiloxane and a branched polyorganosiloxane. In the case of using the mixture, for increasing the mechanical strength and the modulus of elasticity of the cured product, it is preferred to use a mixture of from 2 to 50% by weight of a branched polyorganosiloxane comprising a $R_3SiO_{1/2}$ unit, a $SiO_2$ unit, and, if necessary, a $R_2SiO$ unit (wherein R represents the organic group as described above, wherein at least 2, preferably at least 3 in one molecule are monovalent aliphatic unsaturated hydrocarbon groups) compounded in the polyorganosiloxane as the component (A) and rest being the straight chain polydiorganosiloxane both the terminals of which are blocked with a monovalent aliphatic unsaturated hydrocarbon group, respectively.

There is no particular restriction on the degree of polymerization of the component (A) but in order that the composition before curing has a good flowability and a good workability and the composition after curing has a proper elasticity, the viscosity at 25° C. is preferably from 500 to 500,000 cP, and particularly preferably from 1,000 to 100,000 cP.

The polyorganohydrogensiloxane used as the component (B) in the present invention functions as a crosslinking agent for the component (A) by the addition reaction of a hydrosilyl group contained in the molecule to the monovalent aliphatic unsaturated hydrocarbon groups in the component (A), and has at least 3 hydrogen atoms bonded to the silicon atom taking part in the addition reaction for forming a network structure of the cured product.

Examples of the organic group bonded to the silicon atom of the siloxane unit are the same organic groups as described above other than the monovalent aliphatic unsaturated hydrocarbon groups in the component (A) and in these organic groups, a methyl group is most preferred from the point that the synthesis is easy.

The siloxane skeleton in the component (B) may be a straight chain form, a branched form, or a cyclic form. Further, a mixture of them may be used.

There is no particular restriction on the degree of polymerization of the component (B) but since the synthesis of the polyorganohydrogensiloxane wherein at least 2 hydrogen atoms are bonded to the same silicon atom is difficult, it is preferred to be composed of at least 3 siloxane units.

Specific examples of the component (B) are illustrated as follows.

a. A branched polyorganohydrogensiloxane comprising a $(CH_3)_2HSiO_{1/2}$ unit and a $SiO_2$ unit.

b. A straight chain polyorganohydrogensiloxane represented by following formula (1);

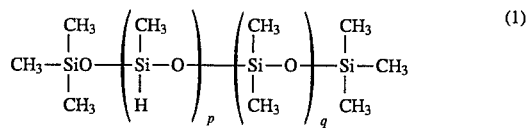

wherein p represents an integer of from 3 to 100 and q represents an integer of from 0 to 100.

c. A straight chain polyorganohydrogensiloxane represented by following formula (2);

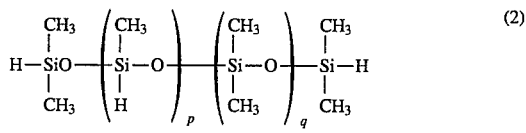

wherein p represents an integer of from 1 to 100 and q represents an integer of from 0 to 100.

The compounding amount of the component (B) is the amount that the number of the hydrogen atom(s) bonded to the silicon atoms in the component (B) becomes from 0.5 to 5, and preferably from 1 to 3, per one monovalent aliphatic unsaturated hydrocarbon group in the component (A). If the amount is such that the existing ratio of the hydrogen atom(s) is less than 0.5, curing is incompletely finished. On the other hand, if the amount is that the existing ratio of the hydrogen atoms is over 5, not only is the compression set of the injection molded product increased but also foaming is liable to occur at curing to sometimes give moldings having a poor surface state.

The platinum type compound used as the component (C) in the present invention is a catalyst for accelerating the addition reaction between the monovalent aliphatic unsaturated hydrocarbon groups in the component (A) and the hydrosilyl group in the component (B) and is excellent in the point that the catalytic ability for the curing reaction at about ordinary temperature is good.

Examples of the platinum type compound are chloroauric acid, a reaction product of chloroauric acid and an alcohol, a platinum-olefin complex, a platinum-vinylsiloxane complex, and a platinum-phosphine complex.

In these platinum type compounds, from the viewpoints that the solubility in the component (B) is good and the catalytic activity is good, the reaction product of chloroauric acid and alcohol, and the platinum-vinylsiloxane, etc., are preferred.

The compounding amount of the component (C) is from 1 to 100 ppm by weight, and preferably from 2 to 50 ppm by weight, converted as a platinum atom, based on the weight of the component (A). If the compounding amount is less than 1 ppm by weight, the curing rate is slow and the cycle time for injection molding becomes long, which is not efficient. On the other hand, if the compounding amount is over 100 ppm by weight, the curing rate is excessively increased, whereby the workability after compounding each component is spoiled and the addition of such a large amount of the component (C) is uneconomical.

The silica fine powder used as the component (D) in the present invention may be one conventionally used for silicone rubbers, and examples thereof are fumed silica, precipitated silica, silica aerogel, molten silica, a quartz powder, and diatomaceous earth. These silica fine powders may be used by rendering, if necessary, the surfaces thereof hydrophobic with an organic silicon compound such as polyorganosiloxane, trimethylchlorosilane, hexamethyldisilazane, etc.

The compounding amount of the component (D) is from 20 to 200 parts by weight, and preferably from 60 to 120 parts by weight, per 100 parts by weight of the component (A). If the compounding amount is less than 20 parts by weight, a sufficient hardness, a sufficient mechanical property, and a sufficient flame retardance cannot be imparted to the moldings and if the compounding amount is over 200 parts by weight, not only is the flowability of the uncured mixture reduced to spoil the workability but also the mechanical property of the moldings is lowered.

The component (E) used in the present invention is the most characteristic component in the present invention and is an important component for reducing the compression set of the moldings obtained by primary molding. The component (E) is preferably the components shown by following formulae (3) and (4).

$$R^1\text{—}N\text{=}N\text{—}R^2 \quad (3)$$

$$R^1\text{—}N\text{=}N\text{—}R^2 \quad (4)$$
$$\quad\;\;\downarrow$$
$$\quad\;\;O$$

wherein $R^1$ and $R^2$ each represents a substituted or unsubstituted monovalent hydrocarbon group or an aminocarbonyl group.

Examples of such an azo compound are azobenzene, o-aminoazobenzene, p-aminoazobenzene, 2,2'-azobisisobutyronitrile, 2,2'-azobis(2,4-dimethylvaleronitrile), azoxybenzene, azoxybenzoic acid, and azodicarbonamide. In these azo compounds, from the viewpoints that the azo compound has a decomposition temperature exceeding 170° C. such that the azo compound does not cause a decomposition under the injection molding condition of the composition, such an azo compound is preferred and handling is easy and effective, and azodicarbonamide is particularly preferred.

The compounding amount of the component (E) is from 0.01 to 1.0 part by weight, and preferably from 0.1 to 0.5 part by weight, per 100 parts by weight of the component (A). If the compounding amount is less than 0.01 part by weight, there is no effect of reducing the compression set and if the compounding amount is over 1.0 part by weight, the azo compound gives a bad influence on the curing property and foaming sometimes occurs.

Carbon black used as the component (F) in the present invention imparts a flame retardance to the moldings. Examples of the carbon black used in the present invention are furnace black, thermal black, channel black, acetylene black, ketchen black, etc.

The compounding amount of carbon black is from 0.5 to 15 parts by weight, and preferably from 1 to 5 parts by weight, per 100 parts by weight of the component (A). If the compounding amount is less than 0.5 part by weight, the effect of imparting a flame retardance is not obtained and if the compounding amount is over 15 parts by weight, the viscosity of the uncured mixture is too increased and the workability is reduced.

The cerium compound used as the component (G) in the present invention is at least one kind of cerium hydroxide and cerium oxide, and cerium may be trivalent or tetravalent.

By compounding the component (G) in an amount of the specific range, the compression set of the moldings is kept at a low level and in regard to the improvement of the flame retardance, the component (G) shows a synergistic effect with the component (E).

The compounding amount of the component (G) is from 0.1 to 2.0 parts by weight, and preferably from 0.2 to 1.2 parts by weight, per 100 parts by weight of the component (A). If the compounding amount is less than 0.1 part by weight, the compression set becomes large and if the compounding amount is over 2.0 parts by weight, the component also gives a bad influence on the compression set.

For improving the storage stability and the workability by prolonging the curing time of the silicone rubber composition for injection molding of the present invention at room temperature, the silicone rubber composition may be compounded with a curing retardant such as an acetylene alcohol compound, a vinyl group-containing low molecular weight siloxane compound, diallyl maleate, triallyl isocyanurate, a nitrile compound, an organic peroxide, etc. Furthermore, the composition may be, if necessary, compounded with a pigment, a plasticizer, etc.

The composition of the present invention is prepared by mechanically mixing the predetermined amounts of the components (A) to (G) together with, if necessary, other components which are optionally compounded with the composition. Usually, the component group containing the component (B) and the component group containing the component (C) are separately stored and both the component groups are used by uniformly mixing them directly before using by, for example, a mixing means equipped with an injection molding machine but all the components can be stored in the same container in the presence of a curing retardant. Curing can be carried out by injection molding at conditions at a temperature of from 80° to 170° C. and a curing time of from 10 to 300 seconds and does not need a postcure by heating for a long time.

According to the present invention, a composition for obtaining silicone rubber moldings is provided having a small compression set and an excellent flame retardance without need of applying a postcure after primary molding by injection. In the case of mass-producing various moldings by injection molding using the composition of the present invention, the production cost can be decreased by shortening all the working times. Moreover, it becomes possible to produce by injection molding the moldings to which a postcure cannot be applied, such as integral moldings of a silicone rubber and various kinds of thermoplastic resins by using the composition of the present invention.

The silicone rubber composition for injection molding of the present invention can be widely utilized for injection molding of silicone rubber moldings requiring to have a flame retardance. In particular, by utilizing the above-described advantages, the composition of the present invention is useful in the field of integral molding of the composition with a thermoplastic resin, such as molding of flame retardant anode caps, etc.

The present invention is described in more detail by the following example and comparative examples but the invention is not limited by the example. In the following example and comparative examples, all parts are by weight and the viscosity shows the value at 25° C.

The compression set and the flame retardance were measured as follows.

(1) Compression set: A sample of 6 mm in thickness for measuring the compression set was prepared under the press vulcanization condition described below and without carrying out a postcure, the compression set thereof was measured according to JIS K 6301.

(2) Flame retardance: Test pieces of 1 mm in thickness were prepared under the press vulcanization condition described below. According to the test method of UL94V, 5 test pieces described above were subjected to a flame contact test twice for each test piece and the flame retardance of each test piece was evaluated by the sum of the flaming times.

EXAMPLE 1

A polydimethylsiloxane having a viscosity of 10,000 cP, both the terminals of which were blocked with a dimethylvinylsilyl group, was used as a base polymer, and a base mixture was prepared by mixing 100 parts of the polydimethylsiloxane with 20 parts of fumed silica and 60 parts of a quartz powder. To the mixture were added 1.1 parts of a polymethylhydrogensiloxane having a viscosity of 20 cP, wherein both the terminals were blocked with a trimethylsilyl group and the content of the hydrogen atoms bonded to the silicon atoms was 0.9% by weight, a platinum-polymethylvinylsiloxane complex in an amount of 10 ppm by weight converted as a platinum atom based on the weight of the base polymer, 2.0 parts of carbon black, 0.5 part of cerium(IV) hydroxide, and 0.1 part of azodicarbon amide followed by mixing until a uniform mixture was obtained to obtain a silicone rubber composition for injection molding.

By press vulcanizing the composition at a temperature of 170° C. for 10 minutes, samples having the forms necessary for each measurement were prepared. The measurement results of the hardness, the compression set, and the flame retardance are shown in Table 1 below.

COMPARATIVE EXAMPLES 1 to 5

By following the same procedure as in Example 1 except that all of azodicarbon amide, carbon black, and cerium(IV) hydroxide were not added (Comparative Example 1), one-kind of them was not added (Comparative Example 5) or 2 kinds of them were not added (Comparative Examples 2 to 4), comparison compositions of the compounding ratios shown in Table 1 below were prepared. From each of the comparison compositions, test pieces were prepared by the same manner as in Example 1 and the same evaluations as in Example 1 were carried out. The results are shown in Table 1 below.

TABLE 1

| Composition and Results | Example 1 | Comparative Example 1 | 2 | 3 | 4 | 5 |
|---|---|---|---|---|---|---|
| Polydimethylsiloxane*1 (part) | 100 | 100 | 100 | 100 | 100 | 100 |
| Polymethylhydrogensiloxane (") | 1.1 | 1.1 | 1.1 | 1.1 | 1.1 | 1.1 |
| Fumed silica (") | 20 | 20 | 20 | 20 | 20 | 20 |
| Quartz powder (") | 60 | 60 | 60 | 60 | 60 | 60 |
| Azodicarbon amide (") | 0.1 | — | 0.1 | — | — | 0.1 |
| Carbon Black (") | 2.0 | — | — | 2.0 | — | 2.0 |
| Cerium Hydroxide (") | 0.5 | — | — | — | 0.5 | — |
| Platinum Catalyst*2 (ppm) | 10 | 10 | 10 | 10 | 10 | 10 |
| Hardness (JIS A) | 50 | 51 | 50 | 49 | 50 | 51 |
| Compression set (%) | 15 | 50 | 18 | 48 | 26 | 20 |
| Flame retardance (sec.) | 20 | ≧70 | ≧70 | ≧70 | ≧70 | ≧70 |

(*1): A polydimethylsiloxane blocked with a dimethylvinylisilyl group at both terminals.
(*2): A platinum-polymethylvinylsiloxane complex: The numerical values each is the ratio (weight) of a platinum atom to the polydimethylsiloxane both the terminals of which were blocked with a dimethylvinylsilyl group.

COMPARATIVE EXAMPLES 6 to 8

By following the same procedure as in Example 1 except that the compounding amounts of cerium(IV) hydroxide (Comparative Examples 6 and 7) and azodicarbon amide (Comparative Example 8) were outside of the range of the present invention, comparison compositions having the compositions shown in Table 2 below were prepared.

From each of the comparison compositions, test pieces were prepared as in Example 1 and they were evaluated by the same manners as in Examples 1. The results are shown in Table below.

TABLE 2

| Composition and Results | Comparative Example | | |
|---|---|---|---|
| | 6 | 7 | 8 |
| Polydimethysiloxane*1 (part) | 100 | 100 | 100 |
| Polymethylhydrogen-siloxane (") | 1.1 | 1.1 | 1.1 |
| Fumed silica (") | 20 | 20 | 20 |
| Quartz powder (") | 60 | 60 | 60 |
| Azodicarbon amide (") | 0.1 | 0.1 | 1.3 |
| Carbon Black (") | 2.0 | 2.0 | 2.0 |
| Cerium Hydroxide (") | 0.06 | 2.5 | 0.5 |
| Platinum Catalyst*2 (ppm) | 10 | 10 | 10 |
| Hardness (JIS A) | 50 | 48 | 42 |
| Compression set (%) | 45 | 30 | 45 |
| Flame retardance (sec.) | ≧70 | 30 | ≧70 |

(*1) and (*2): Same as shown in Table 1 above.

As shown in Table 1 and Table 2, the composition of the present invention has a small compression set and an excellent flame retardance, while the comparison compositions lacking in one of the components (E) and (G) and the comparison compositions containing the component (E) or (G) in the amount outside the range of the present invention have a large compression set and a poor flame retardance.

While the invention has been described in detail and with reference to specific embodiments thereof, it will be apparent to one skilled in the art that various changes and modifications can be made therein without departing from the spirit and scope thereof.

What is claimed is:

1. A silicone rubber composition for injection molding, which comprises
   (A) 100 parts by weight of a polyorganosiloxane having at least 2 monovalent aliphatic unsaturated hydrocarbon groups bonded to a silicon atom in the molecule;
   (B) a polyorganohydrogensiloxane having at least 3 hydrogen atoms bonded to the silicon atom in the molecule in an amount such that the number of the hydrogen atoms bonded to the silicon atom becomes from 0.5 to 5 per one monovalent aliphatic unsaturated hydrocarbon group in the component (A);
   (C) a platinum type catalyst in an amount of from 1 to 100 ppm by weight converted as a platinum atom based on the weight of the component (A);
   (D) from 20 to 200 parts by weight of a silica fine powder;
   (E) from 0.01 to 1.0 part by weight of azodicarbon amide;
   (F) from 0.5 to 15 parts by weight of carbon black; and
   (G) from 0.1 to 2.0 parts by weight of at least one kind of cerium hydroxide and cerium oxide.

2. The composition as claimed in claim 1, wherein the component (A) has a viscosity at 25° C. of from 500 to 500,000 cP.

3. The composition as claimed in claim 1, wherein component (B) is:
   a. A branched polyorganohydrogensiloxane comprising a $(CH_3)_2HSiO_2$ unit and a $SiO_2$ unit;
   b. A straight chain polyorganohydrogensiloxane represented by the following formula (1)

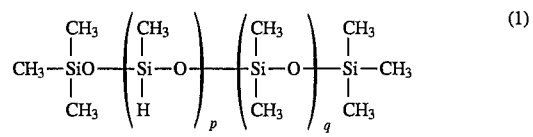

wherein p represents an integer of from 3 to 100 and q represents an integer of from 0 to 100; or c. A straight chain polyorganohydrogensiloxane represented by the following formula (2)

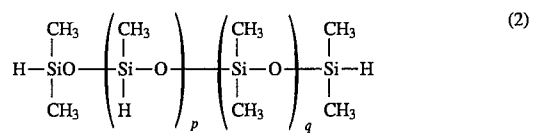

wherein p represents an integer of from 1 to 100 and q represents an integer of from 0 to 100.

4. The composition as claimed in claim 1, wherein the component (C) is chloroauric acid, a platinum-olefin complex, a platinum-vinylsiloxane complex, or a platinum-phosphine complex.

5. The composition as claimed in claim 1, wherein the component (C) is used in an amount of from 2 to 50 ppm by weight calculated as a platinum atom based on the weight of the component (A).

6. The composition as claimed in claim 1, wherein the component (D) is fumed silica, precipitated silica, silica aerogel, molten silica, a quartz powder, or diatomaceous earth.

7. The composition as claimed in claim 1, wherein the component (D) is used in an amount of form 60 to 120 parts by weight per 100 parts by weight of the component (A).

8. The composition as claimed in claim 1, wherein the component (E) is a compound represented by the following formula (3) or (4):

$$R^1\!-\!N\!=\!N\!-\!R^2 \qquad (3)$$

wherein $R^1$ and $R^2$ each represents a substituted or unsubstituted hydrocarbon group or aminocarbonyl group.

9. The composition as claimed in claim 1, wherein the component (E) is used in an amount of from 0.1 to 0.5 part by weight per 100 parts by weight of the component (A).

10. The composition as claimed in claim 1, wherein the component (F) is furnace black, thermal black, channel black, acetylene black or ketchen black.

11. The composition as claimed in claim 1, wherein the component (F) is used in an amount of from 1 to 5 parts by weight per 100 parts by weight of the component (A).

12. The composition as claimed in claim 1, wherein the component (G) is used in an amount of from 0.2 to 1.2 parts by weight per 100 parts by weight of the component (A).

* * * * *